3,515,688
EXTREME SERVICE PHOSPHONITRILE
ELASTOMERS
Selwyn H. Rose, Beachwood, Ohio, assignor to Horizons Incorporated, a division of Horizons Research Incorporated, a corporation of Ohio
No Drawing. Filed Aug. 30, 1967, Ser. No. 664,296
Int. Cl. C08d; C08f; C08g
U.S. Cl. 260—2         7 Claims

ABSTRACT OF THE DISCLOSURE

Copolymers containing randomly repeating units

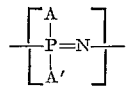

in the polymer in which A and A' are any of $$F(CF_2)_n(CH_2)O—$$
$$H(CF_2)_n(CH_2)O—$$

and $n$ is not greater than about 9, and the units contain various A's, and their preparation.

---

This invention relates to the preparation of solvent resistant elastomers useful under extreme service conditions. More particularly, it relates to the preparation of high molecular weight, amorphous, thermally and chemically stable phosphonitrile copolymers.

Lightly crosslinked high molecular weight phosphonitrilic halides have been known for many years. They may best be obtained by heating $(PNX_2)_3$ in a closed system to 250–300° C. These polymers meet the requirements of an ideal elastomer even better than slightly vulcanized high grade natural rubber. However, they degrade on exposure to water or moist air and soon lose their rubbery properties. For this reason attempts have been made to modify these polymers by replacement of the halogen atoms with other groups.

For example, a swelled slightly cross-linked phosphonitrilic chloride rubber has been reacted with sodium alkoxide in an attempt to replace the chlorine with alkoxide groups. (See Goldschmidt and Dishon, J. Polymer Sci., 3, 481 (1948).) However, the substitutions have been incomplete. A recent improvement described in U.S. Pat. 3,271,330, issued Sept. 6, 1966, describes substitutions of as high as 95% of all the chlorines, with the groups substituted being fluorinated alkoxy radicals of the type:

$$Z(CF_2)_n(CH_2)_mO—$$

where Z is selected from the class consisting of hydrogen, fluorine, and $HOCH_2$ (i.e. methylol); $n$ is an integer of at least 1; $m$ is an integer of from 1 through 18 inclusive and $n$ plus $m$ is at least 2 and not more than 19. The phosphonitrile fluoroester polymers described in said patent are crosslinked, as evidenced by their insolubility in all solvents, they are also somewhat crystalline, as evidenced by their relatively low elongations and "white color," and they are incompletely substituted and are swelled by water and ketones.

A recent publication (Allcock and Kugel, J. Am. Chem. Soc., 87, 4216 (1965)) reports the preparation of a similar fluoroalkoxy derivative, $$[NP—(—O—CH_2—CF_3)_2]_x$$

by first preparing a linear soluble high molecular weight $[PNCl_2]_x$ polymer by terminating the polymerization reaction before the onset of crosslinking and then reacting a benzene solution of this linear high polymer with sodium trifluoroethoxide to obtain the completely substituted polymer. The trifluoroethoxy derivative is a crystalline plastic with a melting point of 240° C. and is soluble in many common oxygenated organic solvents, e.g. acetone.

The copolymers of the present invention are prepared by reacting a mixture of at least two different alkali metal fluoroalkoxides with the linear soluble $[PNCl_2]_x$ polymer. For example, a benzene solution of the linear soluble $[PNCl_2]_x$ polymer was added to an excess stoichiometric mixture of $NaOCH_2CF_3$ and $NaOCH_2C_3F_7$ in tetrahydrofuran and reacted under suitable conditions. A copolymer corresponding to $$[NP(OCH_2CF_3)_2—NP(OCH_2—C_3F_7)_2]_x$$

resulted. This copolymer is an amorphous colorless linear high molecular weight elastomer with high elongation. It has a glass transition point of −77° C. and is thermally stable to over 300° C. on a thermobalance. It is hydrolytically stable to prolonged immersion in boiling water and is insoluble in and unaffected by common solvents— but dissolves completely in fluorocarbon solvents such as $CClF_2CCl_2F$.

The copolymers of the present invention contain a random distribution of these recurring monomer units:

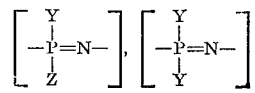

and

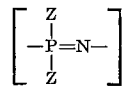

wherein Y is a fluoroalkoxy radical having the formula $W(CF_2)_n(CH_2)O$ in which W is either fluorine or hydrogen, $n$ is an integer from 1 to 4; and Z is a different fluoroalkoxy radical having the formula $$W(CF_2)_m—CH_2—O—$$

wherein W is either fluorine or hydrogen and $m$ is an integer equal to from $n_{+2}$ to $n_{+5}$. In the preferred practice of this invention approximately as many Y type sidechains are introduced as Z type sidechains. However, some beneficial effects are obtained with as little as twenty-five percent of either type sidechain and seventy-five percent of the other as compared to the corresponding homopolymers in which the sidechains are entirely Y or Z.

In general as the sum of $m+n$ increases the copolymers become increasingly more solvent resistant and the elastomeric and low temperature properties of the copolymers gradually improve as the sum of $m+n$ increases. These properties are at their best when $m+n$ equals approximately 6 to 8. As the sum of $m+n$ increases further, the elongation goes down and the copolymers begin to resemble plastics rather than elastomers.

The polymers containing a terminal fluorine (W=fluorine)

are quite similar to those containing a terminal hydrogen (W=hydrogen). Polymers with a terminal fluorine are preferred because the glass transition temperatures of such polymers are somewhat lower, the solvent resistances are somewhat better and the elongations are better—especially at low temperatures. The advantage of the copolymers containing terminal hydrogens lies in the relative low cost of the starting materials, namely the ω,1,1-trihydroperfluoroalcohols as opposed to the 1,1 - dihydroperfluoroalcohols.

The copolymers of this invention can be handled like conventional elastomers. They may be converted by milling, vulcanizing and compounding to sheets and other shaped articles. In addition, since most of the polymers are soluble in fluorocarbon solvents they may be cast from solution.

The advantages of these polymers over previously known phosphonitrilic polymers reside in the following unique combination of properties which renders them useful as gasketing materials, fuel tank sealants, expulsion bladders, and the like in extreme temperature and chemical environments.

(1) The polymers are amorphous and exhibit high elongations and elastomeric properties down to very low temperatures. The glass transition temperatures are on the order of −80° C.

(2) The polymers are completely substituted, i.e., they do not contain any appreciable residual phosphorous-halogen linkages. This renders them particularly chemically inert over long time periods at elevated temperatures. This complete substitution also renders them more thermally stable than many of the polymers of the prior art. The initial decomposition point of most of these polymers on a thermobalance at a heating rate of 2½° C. min. is above 300° C. Some of them are thermally stable at temperatures above 350° C.

(3) The polymers are insoluble in and are not swelled by all common solvents. They are soluble in selected fluorocarbon solvents such as trifluorotrichloroethane and hence they may be fabricated by casting techniques.

This invention is further illustrated by reference to the following examples.

EXAMPLE 1

(a) Preparation of linear high molecular weight phosphonitrilic chloride precursor The trimer or tetramer or other low polymer of phosphonitrilic chloride is prepared from the monomer by conventional techniques.

The $[PNCl_2]_3$ trimer was recrystallized from hexane with activated charcoal to remove trace impurities. M.P. 112–115° C.

Forty-one (41) grams of the recrystallized trimer were loaded into a polymerization tube. The trimer was dried and outgassed by alternately melting the sample, allowing it to cool to room temperature and evacuating the polymerization tube. This procedure was repeated two times. The polymerization tube was then sealed under vacuum at a previously arranged constriction.

The tube was placed in a Woods Metal bath thermostatically maintained at 255° C.±5° C. After 30 hours the polymerization tube contained an extremely viscous fluid that was barely mobile at 255° C. It was then removed from the Woods Metal bath. The polymerization rate varied from run to run. Therefore, the reaction was terminated when an extremely viscous fluid (at 250° C.) polymer was obtained, but before the onset of the crosslinking reaction that results in a considerable gel phase. The reaction times were from about 24 to about 48 hours.

A further check on the completeness of the reaction was obtained by cooling the tube to room temperature. If considerable crystallization occurred, it was considered an indication that the trimer had not yet polymerized and that further heating was required.

The polymerization tube was broken under a nitrogen atmosphere and the bulk of the polymer added to a flask protected by a nitrogen atmosphere which contained 250 ml. of dry benzene (distilled from $CaH_2$). It normally took about 24 hours for all of the linear phosphonitrilic chloride polymer to dissolve. (This distinguishes this linear polymer from "poly $NPCl_2$ rubber" described in U.S. Pat. 3,271,330, Example A, which will swell in, but not dissolve in benzene.)

The linear phosphonitrilic chloride polymer was stored protected from moisture and was used promptly since after standing several days, the material crosslinks to form an insoluble gel.

(b) Synthesis of $[NP(OCH_2CF_3)_2—NP(OCH_2C_3F_7)_2]_x$

Approximately 200 ml. of tetrahydrofuran was distilled from $CaH_2$ into a dry 1 liter three necked flask protected by a stream of nitrogen. A stoichiometric mixture of .20 mole $CF_3CH_2OH$ and .20 mole $C_3F_7CH_2OH$ was added to the flask followed by .34 mole of sodium, which was trimmed and weighed under dry benzene. The reaction mixture was permitted to stand undisturbed overnight and was then refluxed for three hours to insure complete reaction.

A benzene solution of approximately .16 mole of linear phosphonitrilic chloride polymer was added dropwise to the refluxing mixture over the course of an hour with agitation being provided by a magnetic stirrer. A precipitate formed almost immediately. The reaction mixture was refluxed overnight. Approximately 200 ml. of dry n-butyl ether was then distilled into the reaction vessel and approximately 220 ml. of solvent was distilled out—until the reflux temperature was 115° C. The reaction mixture was then refluxed overnight at 115° C. to insure complete substitution for all of the chloride.

The reaction mixture was acidified with dilute HCl and the gum-like precipitate filtered off. It was washed thoroughly with water and then with a large quantity of an acetone-water mixture. The high polymer was separated from the oligomer fractions by dissolving it in 300 ml. of an azeotropic mixture of $CClF_2CCl_2F$ and acetone (89% $CClF_2CCl_2F$— Du Pont "Freon TA") and then precipitating it into 1600 ml. of benzene. A yield of 8.2 g. was obtained.

*Analysis.*—Calculated for 1:1 copolymers (percent): C, 21.0; H, 1.2; N, 4.1. Found (percent): C, 21.3; H, 1.2; N, 3.7.

A negligible quantity of chlorine was also found (~1%) due to the presence of occluded NaCl which is extremely difficult to remove quantitatively.

The copolymer is amorphous, exhibits good elastomeric properties and has a high degree of elongation. It is insoluble in and not swelled by all the common solvents tried, namely, ethers, alcohols, acetone, water, chloroform, hexane, formamide, and aromatic solvents. It dissolves completely in fluorocarbon solvents such as trifluorotrichloroethane. It is unaffected by prolonged immersion in boiling water, strong acids or bases.

The initial decomposition point on a thermobalance is 370° C. in air and over 300° C. in nitrogen. The glass transition temperature of the copolymer is −77° C. Thus the useful temperature range is on the order of −77° C. to over 300° C.

Examples 2–8

Using the procedure of Example 1, with minor variations in procedure from copolymer to copolymer such as the choice of reaction solvents, the temperature and times of the substitution reactions and the purification of the products, the following copolymers were prepared from linear phosphonitrilic chloride high polymer and appropriate mixtures of sodium fluoroalkoxides. As the length of the sidechains are increased, longer reaction times were required for complete substitution.

| Example | Y | Z | Y:Z | Product |
|---|---|---|---|---|
| 2 | $CF_3-CH_2-O-$ | $F(CF_2)_3-CH_2-O$ | ~1:3 | Elastomer, lower elongation, better solvent resistance, and more crystalline as compared to 1:1 copolymer of Example 1. |
| 3 | $CF_3-CH_2-O-$ | $F(CH_2)_3-CH_2-O$ | ~3:1 | Elastomer, tougher, less solvent resistant and more crystalline as compared to 1:1 copolymer of Example 1. |
| 4 | $CF_3-CH_2-O-$ | $F(CF_2)_4-CH_2-O-$ | ~1:1 | Elastomer, more chemically resistant than copolymer of Example 1. |
| 5 | $F(CF_2)_2-CH_2-O-$ | $F(CF_2)_5-CH_2-O-$ | ~1:1 | Elastomer, completely amorphous, very chemically resistant, good elongation. |
| 6 | $F(CF_2)_4-CH_2-O-$ | $F(CF_2)_9-CH_2-O-$ | ~1:1 | Plastic, low elongation excellent solvent resistance. |
| 7 | $H(CF_2)_2-CH_2-O-$ | $H(CF_2)_4-CH_2-O-$ | ~1:1 | Elastomer, less solvent resistant than and low temperature properties not as good as polymer of Example 1. |
| 8 | $H(CF_2)_2-CH_2-O-$ | $H(CF_2)_6-CH_2-O-$ | ~1:1 | Elastomer, better solvent resistance than polymer of Example 7, but not as good as polymer of Example 1. |

I claim:
1. A high molecular weight elastomeric chemically and thermally stable solvent resistant phosphonitrile copolymer with a low glass transition temperature having randomly distributed repeating units of the formulas:

$$[-\overset{Y}{\underset{Z}{P}}=N-], \quad [-\overset{Y}{\underset{Y}{P}}=N-] \text{ and } [-\overset{Z}{\underset{Z}{P}}=N-]$$

wherein Y represents a monovalent radical selected from the group consisting of $F(CF_2)_n(CH_2)O-$ and $$H(CF_2)_n(CH_2)O-$$

and $n$ is an integer from 1 to 4 and wherein Z represents a monovalent radical selected from the group consisting of $F(FC_2)_m(CH_2O)-$ and $H(CF_2)_m(CH_2)O-$ and $m$ is an integer from $n+2$ to $n+5$, and the Y:Z ratio is between 1:3 and 3:1.

2. A copolymer of claim 1 wherein Y is $CF_3(CH_2)O-$ and Z is $F(CF_2)_3(CH_2)O-$.

3. A copolymer of claim 1 wherein Y is $CF_3(CH_2)O-$ and Z is $F(CF_2)_4(CH_2)O-$.

4. A copolymer of claim 1 wherein Y is $$F(CF_2)_2(CH_2)O-$$

and Z is $F(CF_2)_4(CH_2)O-$.

5. A copolymer of claim 1 wherein Y is $$F(CF_2)_2(CH_2)O-$$

and Z is $F(CF_2)_5(CH_2)O-$.

6. A copolymer of claim 1 wherein Y is $$H(CF_2)_2(CH_2)O-$$

and Z is $H(CF_2)_4(CH_2)O-$.

7. A copolymer of claim 1 wherein Y is $$H(CF_2)_2(CH_2)O-$$

and Z is $H(CF_2)_6(CH_2)O-$.

References Cited

UNITED STATES PATENTS

| 2,876,247 | 3/1959 | Ratz et al. | 260—2 |
| 3,271,330 | 9/1966 | Evans | 260—2 |
| 3,370,020 | 2/1968 | Allcock et al. | 260—2 |

SAMUEL H. BLECH, Primary Examiner

U.S. Cl. X.R.

23—357; 260—33.8